(12) United States Patent
    Illarionov

(10) Patent No.: US 12,617,331 B2
(45) Date of Patent: May 5, 2026

(54) DEVICE FOR AIDING A TRUCK DRIVER IN LOADING OR UNLOADING A CARGO PLATFORM

(71) Applicant: Dmitrii Illarionov, Austin, TX (US)

(72) Inventor: Dmitrii Illarionov, Austin, TX (US)

( * ) Notice: Subject to any disclaimer, the term of this patent is extended or adjusted under 35 U.S.C. 154(b) by 1030 days.

(21) Appl. No.: 17/742,374

(22) Filed: May 11, 2022

(65) Prior Publication Data

US 2023/0124146 A1    Apr. 20, 2023

Related U.S. Application Data

(60) Provisional application No. 63/257,963, filed on Oct. 20, 2021.

(51) Int. Cl.
    *B60P 7/08*     (2006.01)
    *B25G 1/04*     (2006.01)
    *B25J 1/04*     (2006.01)
    *B60P 7/00*     (2006.01)

(52) U.S. Cl.
    CPC .............. *B60P 7/0853* (2013.01); *B25J 1/04* (2013.01); *B25G 1/04* (2013.01); *B60P 7/0823* (2013.01)

(58) Field of Classification Search
    CPC ..... B25B 9/00; B25J 1/04; E01H 1/12; B25G 1/04; B60P 7/0853; B60P 7/0823; B60P 7/0869
    USPC ....................................................... 294/209
    See application file for complete search history.

(56) References Cited

U.S. PATENT DOCUMENTS

| | | | |
|---|---|---|---|
| 3,161,149 A | 12/1964 | Monus | |
| 5,425,154 A | 6/1995 | Edwards, Jr. | |
| 5,481,950 A * | 1/1996 | Browning ................. | B25F 1/00 81/488 |

(Continued)

FOREIGN PATENT DOCUMENTS

| | | |
|---|---|---|
| CA | 2577739 A1 | 8/2007 |
| DE | 202009016946 U1 | 7/2010 |

(Continued)

OTHER PUBLICATIONS

Gavase Tool; Cargo Tie Down Straps/Chains, V-Boards, Corner Protectors Placement Tool; https://gavasetool.com/.

(Continued)

*Primary Examiner* — Mahdi H Nejad

(57)     ABSTRACT

Device for aiding a truck driver in loading/unloading a cargo platform including a grapple that connects to a telescopic handle. The grapple includes two arms forming grooves at the centre. Each arm includes hooks extending in opposing directions to help receive components used for securing a load to the cargo platform such as a flatbed truck. Components include cargo straps, winch straps, edge protectors, chains, binders, clips, plates, flanges, detents, hooks, cables, and the like. The grapple includes a plate member connecting the arms at one side and sliding along the grapple allowing the truck driver to use the grapple along with the telescopic handle. The plate member in conjunction with the grapple allows to hold/place components at desired location for securing the load to the cargo platform. The truck driver adjusts length of the telescopic handle and uses the grapple to hold components during loading/unloading of the cargo platform.

8 Claims, 20 Drawing Sheets

(56) References Cited

U.S. PATENT DOCUMENTS

| | | | |
|---|---|---|---|
| 6,783,312 B2 | 8/2004 | Smith | |
| 6,820,906 B1 | 11/2004 | McClendon | |
| 7,900,985 B2 | 3/2011 | Goodfellow et al. | |
| D696,105 S | 12/2013 | Devilliers et al. | |
| 8,641,110 B1 * | 2/2014 | Perry | A47F 13/06 |
| | | | 294/24 |
| 8,915,685 B2 | 12/2014 | Flores et al. | |
| 9,610,885 B2 | 4/2017 | Williams | |
| 10,081,097 B1 * | 9/2018 | Abbey | B25G 1/04 |
| D891,239 S | 7/2020 | Goldstein | |
| 10,759,453 B1 * | 9/2020 | Ayala | B61L 7/027 |
| 2006/0150779 A1 * | 7/2006 | Rider | H02G 1/04 |
| | | | 7/143 |
| 2008/0029745 A1 | 2/2008 | Chartier | |
| 2008/0314372 A1 | 12/2008 | Guindon et al. | |
| 2020/0276928 A1 | 9/2020 | Vella | |
| 2022/0219596 A1 * | 7/2022 | Elniski | B60P 7/0876 |

FOREIGN PATENT DOCUMENTS

| | | | | |
|---|---|---|---|---|
| DE | 202019106572 U1 | 1/2020 | | |
| FR | 3028197 A1 * | 5/2016 | | B60P 7/0853 |
| FR | 3028197 B1 | 12/2016 | | |
| GB | 2177471 B | 7/1989 | | |
| JP | D1121222 | 9/2001 | | |
| JP | D1298877 | 4/2007 | | |
| SE | 509368 C2 | 1/1999 | | |
| WO | 2009136188 A1 | 11/2009 | | |
| WO | WO-2010051026 A1 * | 5/2010 | | B25G 1/04 |
| WO | 2016011497 A1 | 1/2016 | | |

OTHER PUBLICATIONS

HECT-OR-OLL; Cobra High Load Strap Handler Hect-or-oll; https://hectoroll.com/cobra.

* cited by examiner

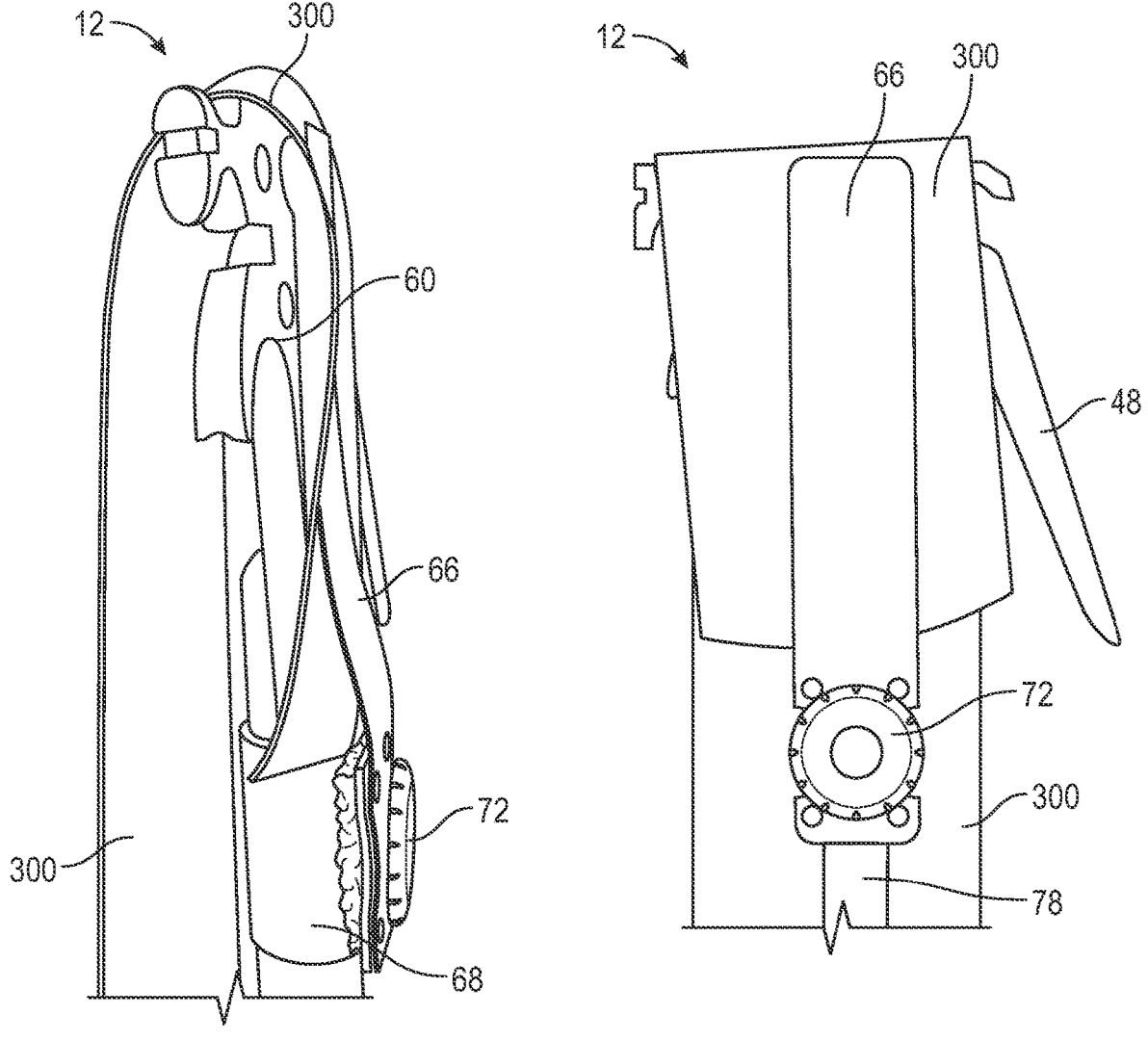
FIG. 10A          FIG. 10B

DEVICE FOR AIDING A TRUCK DRIVER IN LOADING OR UNLOADING A CARGO PLATFORM

RELATED APPLICATIONS AND CLAIM FOR PRIORITY

The present application claims priority from U.S. Provisional Patent Application Ser. No. 63/257,963 filed Oct. 20, 2021, which is incorporated herein by its entirety and referenced thereto.

FIELD OF INVENTION

The present invention generally relates to accessories for vehicles. More specifically, the present invention relates to a device for aiding a truck driver in loading or unloading a cargo platform such as a flatbed truck.

BACKGROUND OF INVENTION

It is known that cargo platforms such as flatbed trucks are commonly used to transport heavy loads that usually do not fit on traditional trucks. Typically, the cargo platforms are used to transport heavy pieces of machinery, construction equipment, motor vehicles, sheds, parts of houses and the like.

It is important to properly secure the heavy loads or large objects to the tray of the cargo platform. Securing the heavy loads to the tray or platform includes strapping of the objects to the anchor points using straps. Further, edge protectors are placed over the objects to prevent the straps from damaging the objects. It is a common practice for the truck drivers to climb onto the platform, and even onto the loaded objects itself to strap or unstrap during the loading or unloading procedure. This increases the risk of injury to the truck drivers.

In order to overcome the above problems, several devices have been disclosed in the past that help the truck drivers to strap the loads at heights. One such example is disclosed in a U.S. Pat. No. 10,081,097, entitled, "Tool for placement of cargo straps and edge protectors" ("the '097 Patent"). The '097 Patent discloses a tool for the placement of cargo straps and edge protectors is configured for use with a flatbed trailer. The tool for the placement of cargo straps and edge protectors is configured for use with a webbing. The webbing is used to secure cargo to the flatbed trailer. The tool for the placement of cargo straps and edge protectors attaches to the webbing. The tool for the placement of cargo straps and edge protectors is used to position the webbing relative to the cargo such that once the webbing is tightened the webbing to be tightened secures the cargo to the flatbed trailer. The tool for the placement of cargo straps and edge protectors comprises a telescopic handle, a spatula, and a threaded connection.

Another example is disclosed in a United States Publication No. 20200276928, entitled "A device for strapping a load at heights" ("the '928 Publication"). The '928 Publication discloses a load strapping device comprising a first elongated member having a first end, a second elongated member having a second end and a pivot assembly interconnecting the first and second ends. A strap end receiving assembly is connected to a free end of one of the elongated member. For use, one end of a strap is engaged to the strap end receiving assembly. A load strapping arrangement over a load is formed when a user, located at one side of the load, grips the device and lifts the one end of the strap to a first position just above the height of the load.

Although the above-discussed devices are useful for strapping the loads, they have few problems. For example, the above-discussed devices are limited in their functionality in that they can be used only for connecting the straps to the load. However, they cannot be used for holding components such as chains, wrench straps, grab hooks, cables, and the like. As a result, a truck driver has to carry multiple devices and climb on top of the flatbed to place different components for securing the load. This increases the risk of injury to the truck driver.

Therefore, there is a need for a device for aiding a truck driver in loading or unloading a cargo platform, the device capable of reducing or eliminating the need for the truck driver to climb on top of the flatbed to strap or unstrap the load.

SUMMARY

It is an object of the present invention to provide a device for aiding a truck driver in loading or unloading a cargo platform and that avoids the drawbacks of known devices.

It is another object of the present invention to provide a device capable of reducing or eliminating the need for the truck driver to climb on top of the flatbed to strap or unstrap the load.

It is another object of the present invention to provide a single device capable of holding/harnessing or placing a variety of components required for loading or unloading of the cargo platform such as a flatbed truck.

In order to achieve one or more objects, the present invention presents a device for aiding a truck driver in loading or unloading a cargo platform such as a flatbed truck. The device includes a grapple and a telescopic handle. The grapple connects to the telescopic handle. The grapple includes two arms forming grooves at the centre. Here, the grooves extend from one another and come in different shapes and help in holding a variety of components. In the present invention, the device helps to hold and place the components such as, cargo straps, ratchet cargo straps, winch straps, tarps, edge protectors or strap corner protectors, chains, transport chains, binders, bungee tarp, clips, plates, flanges, detents, hooks or grab hooks, cables, and the like.

Each of the arms includes hooks extending in opposing directions. The hooks help to receive components used for securing a load to the cargo platform. In one example, the hooks include teeth portion for gripping the components during loading or unloading of the cargo. The grapple includes a plate member connecting the arms at one side. The plate member slides along the grapple and allows to the truck driver to use the grapple with the telescopic handle. The plate member in conjunction with the grapple allows to hold and place the components at desired location for securing the load to the cargo platform. The truck driver adjusts the length of the telescopic handle and uses the grapple to hold/harness the components needed during loading or unloading of the cargo platform.

In one advantageous feature of the present invention, the device includes the grapple having hooks extending from both sides. The hooks come in various shapes and configurations and allow to hold and place components during loading or unloading of the cargo platform. The grapple includes a plate member. The plate member receives the component and helps to hold it with the help of grapple for placing the components on the load, for example. The device acts as a multipurpose tool for holding and placing the components for use during loading or unloading of the cargo platform. This avoids use of different tools during loading or unloading of the cargo platform.

In another advantageous feature of the present invention, the device includes the telescopic handle. The truck driver adjusts the length of the telescopic handle and uses the grapple to hold and/or place the components for use during loading or unloading of the cargo platform. This ensures the truck driver is at a safe distance from the heavy load during the loading or unloading procedure. Further, the device reduces or eliminates the need for the truck driver to climb on top of the flatbed to strap down the load. This substantially reduces the likelihood of the truck driver from falling and injuring himself.

In another advantageous feature of the present invention, the device allows for use in any type of cargo transportation, including road, air, rail, and water transport.

Features and advantages of the invention hereof will become more apparent in light of the following detailed description of selected embodiments, as illustrated in the accompanying FIGUREs. As will be realised, the invention disclosed is capable of modifications in various respects, all without departing from the scope of the invention. Accordingly, the drawings and the description are to be regarded as illustrative in nature.

BRIEF DESCRIPTION OF THE DRAWINGS

Further features and advantages of the present invention will become apparent from the following detailed description, taken in combination with the appended drawings, in which:

FIGS. 10A and 10B illustrate a front perspective view and a rear view, respectively of the device holding a winch strap, in accordance with another exemplary embodiment of the present invention;

It will be noted that throughout the appended drawings, like features are identified by like reference numerals.

DETAILED DESCRIPTION OF THE EMBODIMENTS

Before the present features and working principle of a device is described, it is to be understood that this invention is not limited to the particular device as described, since it may vary within the specification indicated. Various features of a device might be provided by introducing variations within the components/subcomponents disclosed herein. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It should be understood that the present invention describes a device for aiding a truck driver in loading or unloading a cargo platform such as a flatbed truck. The device includes a grapple that connects to a telescopic handle. The grapple includes two arms forming grooves at the centre. Each of the arms includes hooks for receiving components used for securing a load to the cargo platform. The components include cargo straps, winch straps, edge protectors, chains, binders, clips, plates, flanges, detents, hooks, cables, and the like. The grapple includes a plate member connecting the arms. The plate member slides along the grapple and allows the truck driver to use the grapple along with the telescopic handle. The plate member in conjunction with the grapple allows to hold and place the components at desired location for securing the load to the cargo platform. The truck driver adjusts the length of the telescopic handle and uses the grapple to hold the components during loading or unloading of the cargo platform.

Various features and embodiments of a device for aiding a truck driver in loading or unloading a cargo platform are explained in conjunction with the description of FIGS. 1-19.

Figure 1:
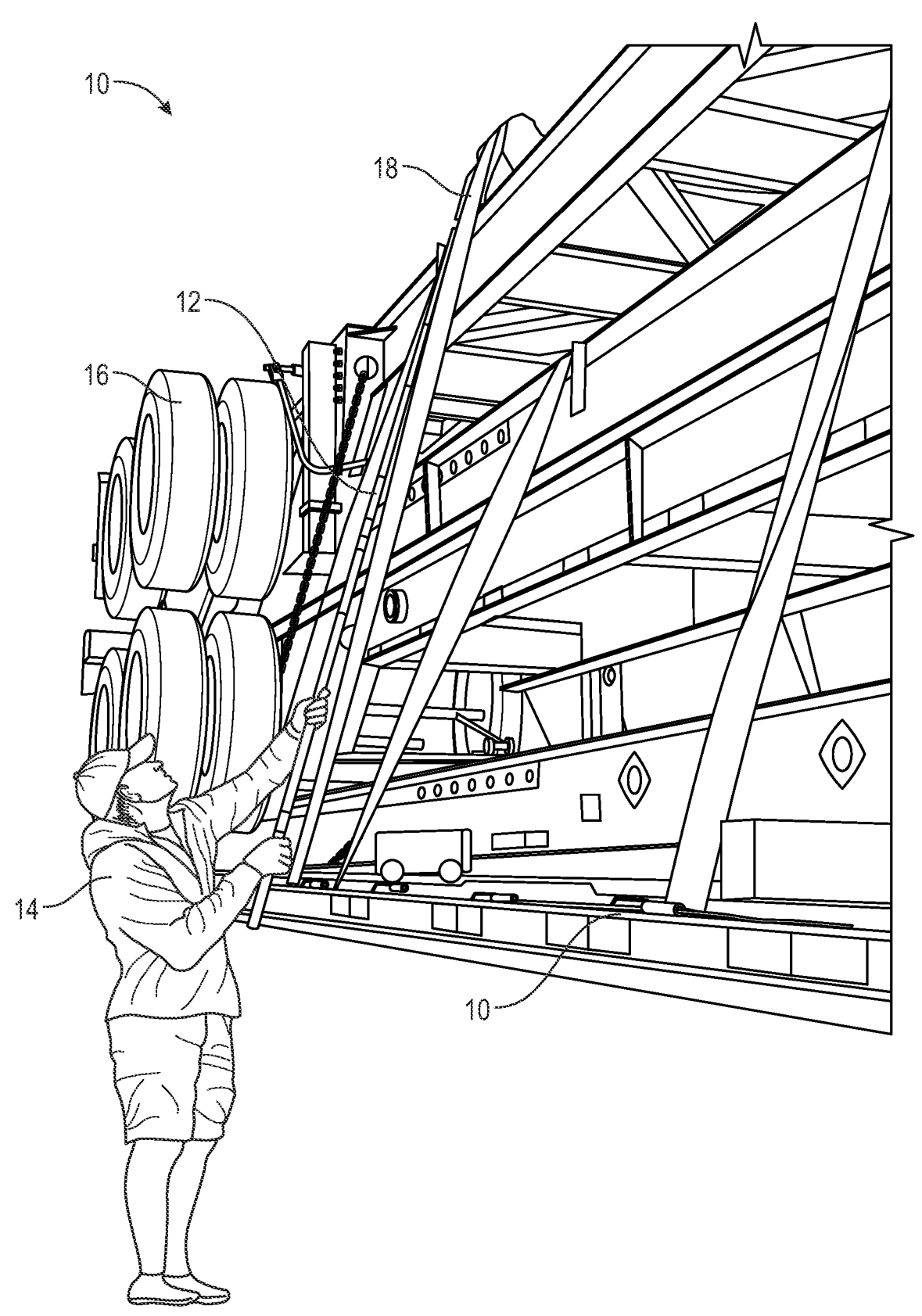
FIG. 1 illustrates an environment in which a device is used, in accordance with one exemplary embodiment of the present invention.

The present invention discloses a device or tool for aiding a truck driver in loading or unloading a cargo platform such as a flatbed truck such as holding and placing cargo straps and edge protectors on the cargo platform. FIG. 1 shows an environment 10 in which device 12 is used, in accordance with one exemplary embodiment of the present invention. A user or truck driver 14 either stands on flatbed trailer 16 or stands on the ground beside flatbed trailer 16 for using device 12 to place components 18 during loading or unloading procedure. Components 18 include, but not limited to, cargo straps, ratchet cargo straps, winch straps, tarps, edge protectors or strap corner protectors, chains, transport chains, binders, bungee tarp, clips, plates, flanges, detents, hooks or grab hooks, cables, and the like.

Figures 2A, 2B:
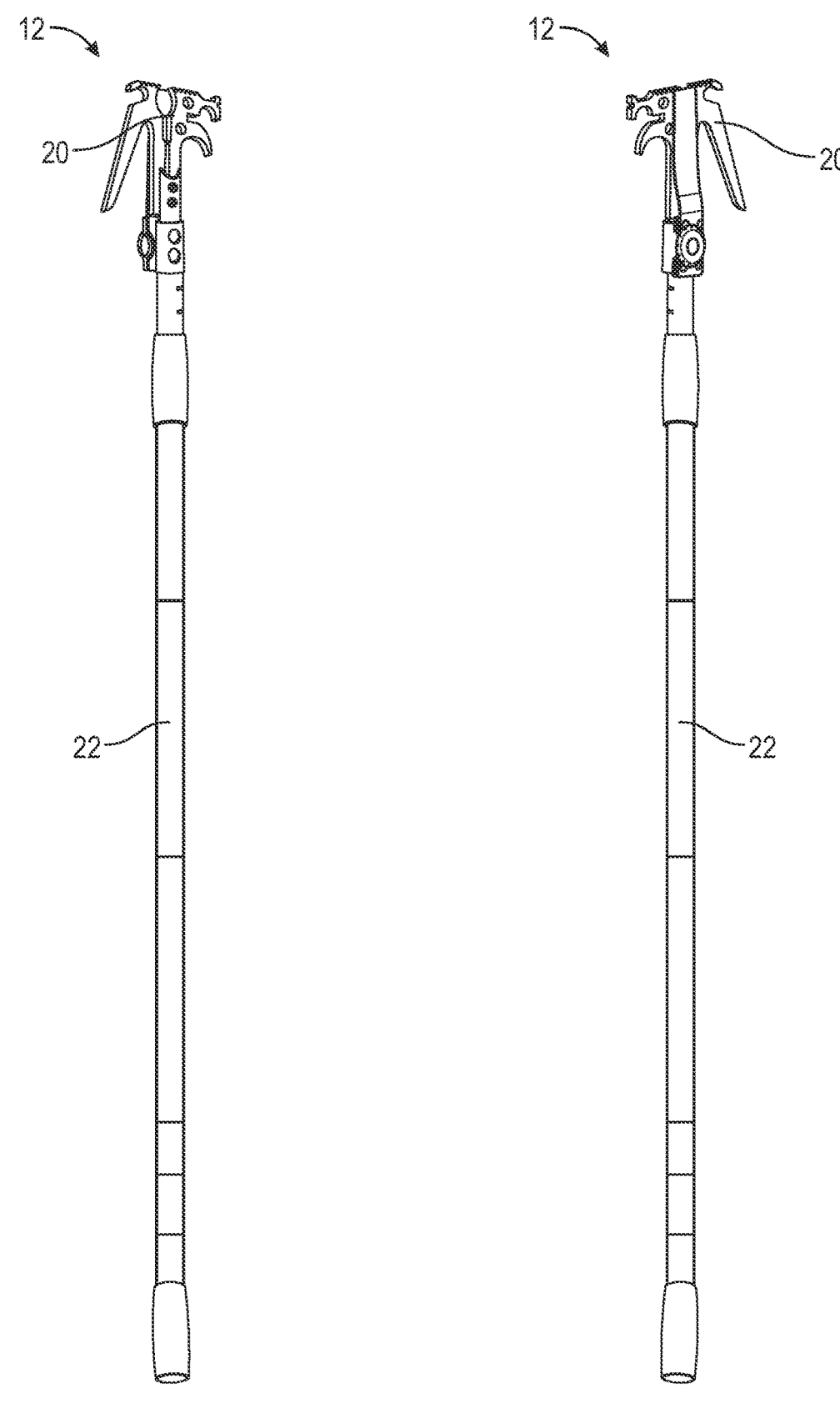
FIGS. 2A and 2B illustrate a front perspective view and a rear perspective view, respectively of the device.
Figures 3A, 3B:
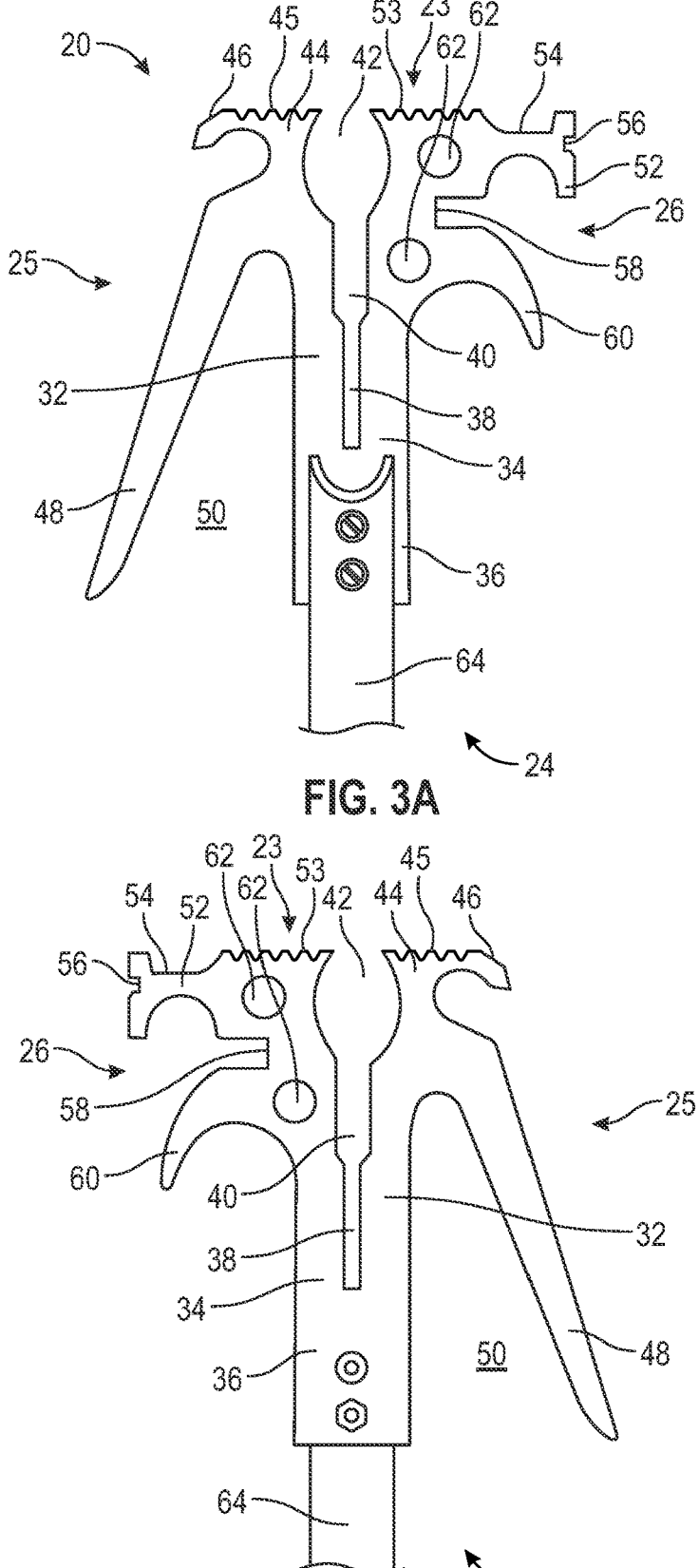
FIGS. 3A, 3B, 3C and 3D illustrate a front view, a rear view, a right side perspective view and a left side perspective view, respectively of a grapple, in accordance with one embodiment of the present invention.
Figures 3C, 3D:
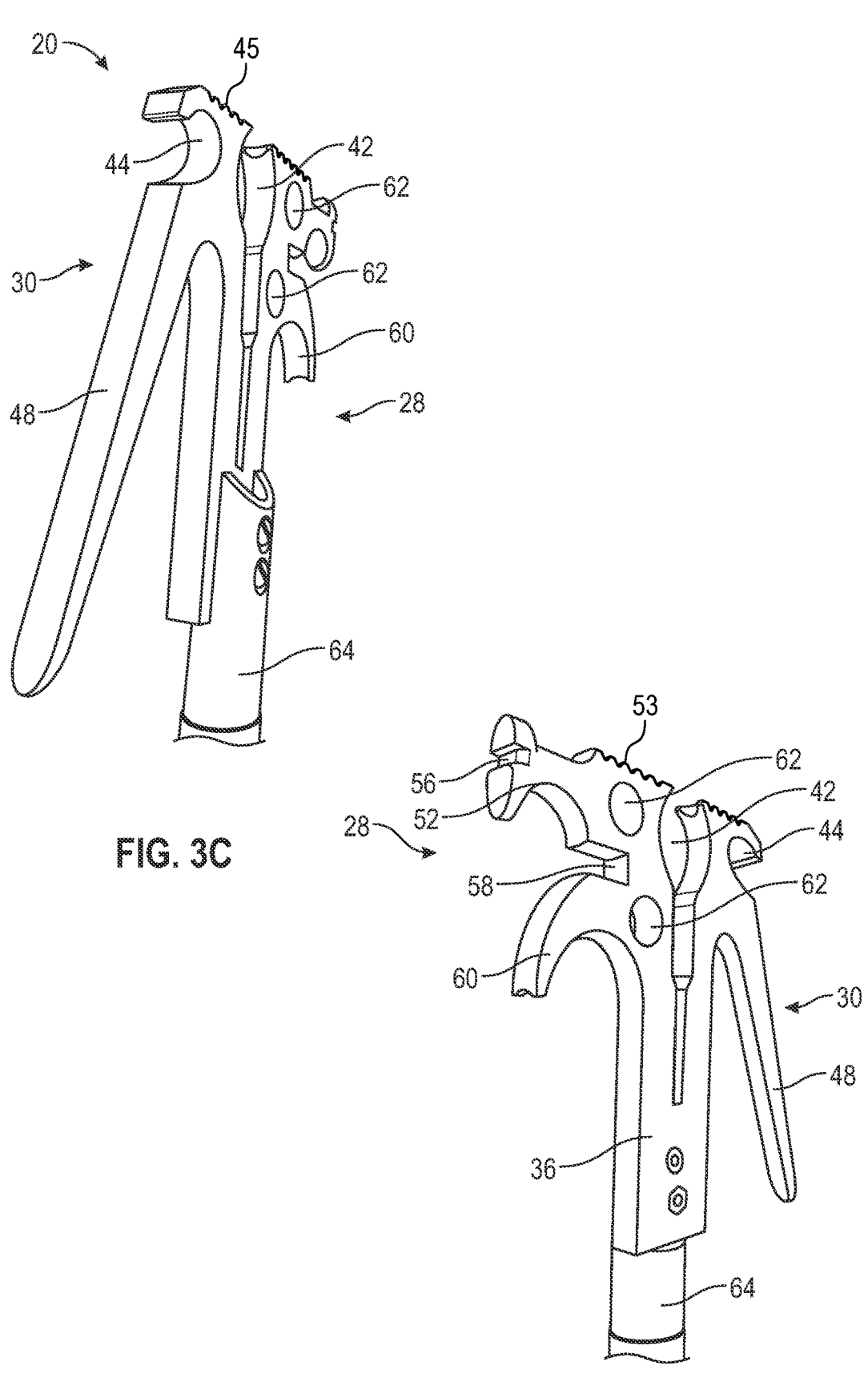

FIGS. 2A and 2B show a front perspective view and a rear perspective view, respectively of device 12. Device 12 includes grapple or grip member or tool 20. Grapple 20 connects to telescopic handle 22. FIGS. 3A, 3B, 3C and 3D show a front view, a rear view, a right side perspective view and a left side perspective view, respectively of grapple 20, in accordance with the present invention. Grapple 20 presents a U-shaped structure. Grapple 20 provides a material made of a metal, hard plastic or any other suitable material. In one example, grapple 20 has a length of approximately 9 inches and a width of approximately 6 inches. Grapple 20 has first end 23, second end 24, first side 25 and fourth side 26, front end 28 and rear end 30. First end 23 indicates a top portion of grapple 20. Second end 24 indicates a bottom portion of grapple 20. First side 25 indicates a left side of grapple 20. Second side 26 indicates a right side of grapple 20. Front end 28 and rear end 30 indicate a front portion and rear portion, respectively of grapple 20, as shown in at least FIGS. 3C and 3D.

As specified above, grapple 20 presents a U-shaped structure. Grapple 20 includes first arm 32 and second arm 34 that connect using bridge section 36. As can be seen from at least FIGS. 3A, 3B, 3C and 3D, first arm 32 and second arm 34 position parallel to each other and bridge section 36 connects to first arm 32 and second arm 34 perpendicularly. First arm 32, second arm 34 and bridge section 36 together form a U-shaped structure. In accordance with one embodiment of the present invention, grapple 20 presents first groove 38, second groove 40 and third groove 42 within first arm 32 and second arm 34. In one example, each of first groove 38, second groove 40 and third groove 42 forms by way of chipping away a portion of material of grapple 20. In one example, first groove 38 forms at bridge section 36 and comes in a rectangular configuration. Second groove 40 forms and extends above first groove 38. Second groove 40 comes in a U-shaped configuration. Third groove 42 forms and extends above second groove 40. In one example, third groove 42 comes in an oval or circular shape. A person skilled in the art understands that each of first groove 38, second groove 40 and third groove 42 forms within first arm 32 and second arm 34 and allows to hold a variety of components 18.

Grapple 20 includes first hook 44. First hook 44 extends from first arm 32 at first side 25. First hook 44 includes first teeth 45 at the top i.e., at first end 23. First teeth 45 helps to grip components during loading and unloading of the cargo. In one example, first hook 44 includes tapered section 46 at the top i.e., at first end 23. Further, grapple 20 includes extended arm 48. Extended arm 48 extends from first arm 32 at an angle of about 45 degrees towards second end 24 at first side 25. Extended arm 48 forms area 50 for receiving larger components 18. In accordance with the present invention, extended arm 48 acts as a hook for holding components 18 during loading and unloading of the load.

Grapple 20 further includes second hook 52 extending from second arm 34 at second side 26. Second hook 52 presents first cut section 54 at first end 23. Second hook 52 includes second teeth 53 at the top i.e., at first end 23. Second teeth 53 helps to grip components during loading and unloading of the cargo. Further, second hook 52 presents second cut section 56 at the second side 26. In addition, grapple 20 includes third cut section 58 adjacent to second hook 52. Grapple 20 further includes third hook 60 extending from second arm 34 at second side 26. Third hook 60 positions underneath second hook 52. In one embodiment, second arm 34 includes holes 62 for connecting components 18. In one example, holes 62 position adjacent to second hook 52 and third hook 54, as shown in at least FIGS. 3A and 3B. Grapple 20 includes connector 64 at second end 24. Connector 64 mounts to bridge section 36 and helps to connect grapple 20 to telescopic handle 22. Connector 64 has a step-structure that allows it to connect to grapple 20.

Figure 4A:
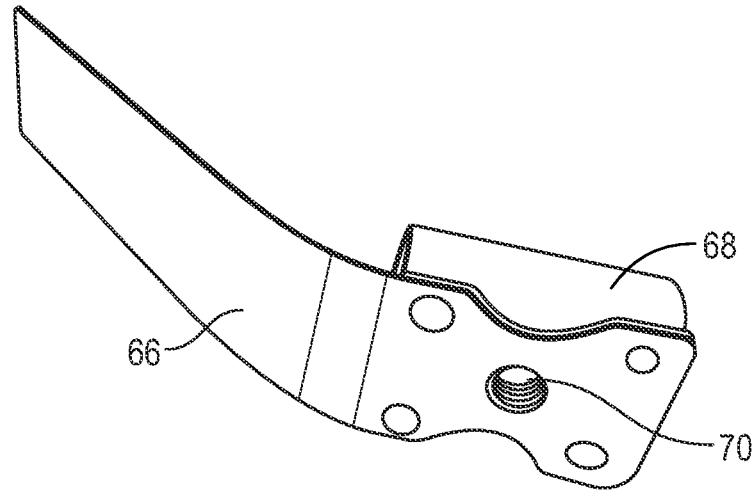
FIGS. 4A and 4B illustrate perspective views of a plate member, in accordance with one embodiment of the present invention.
Figure 4B:
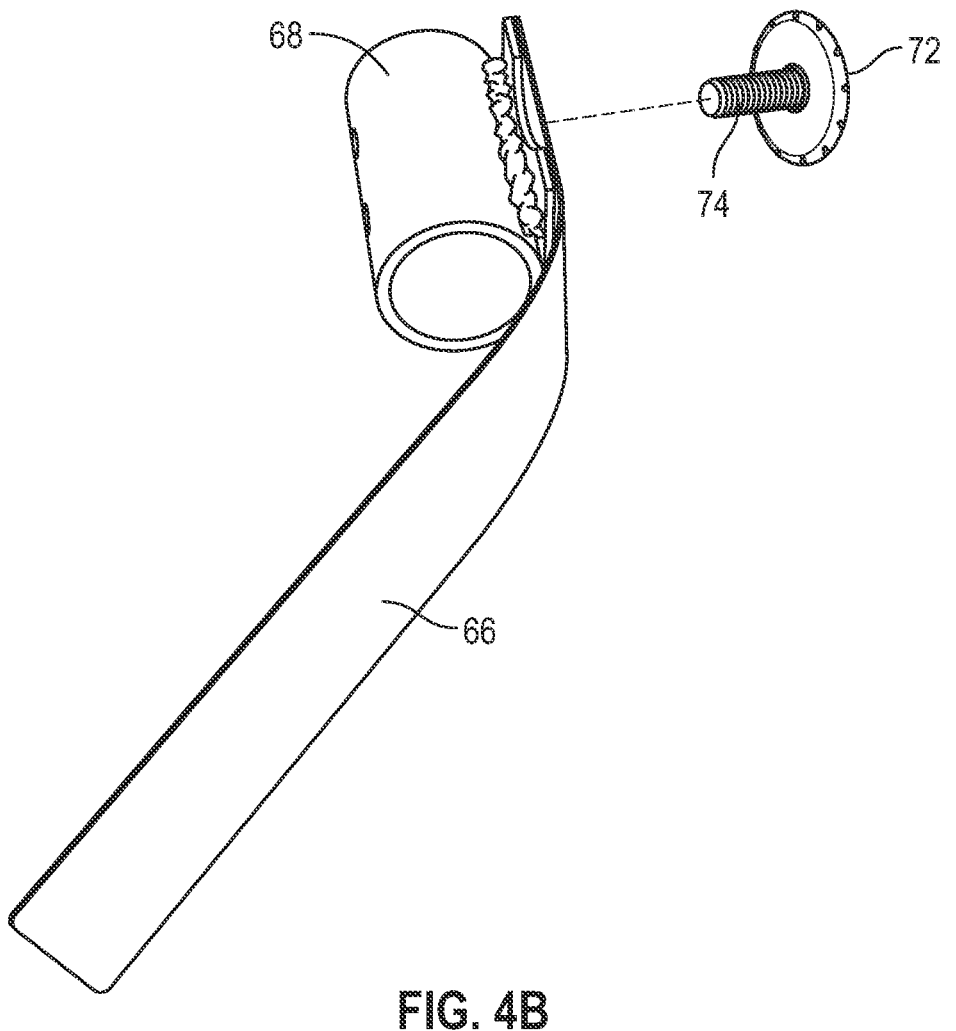
Figures 5A, 5B:
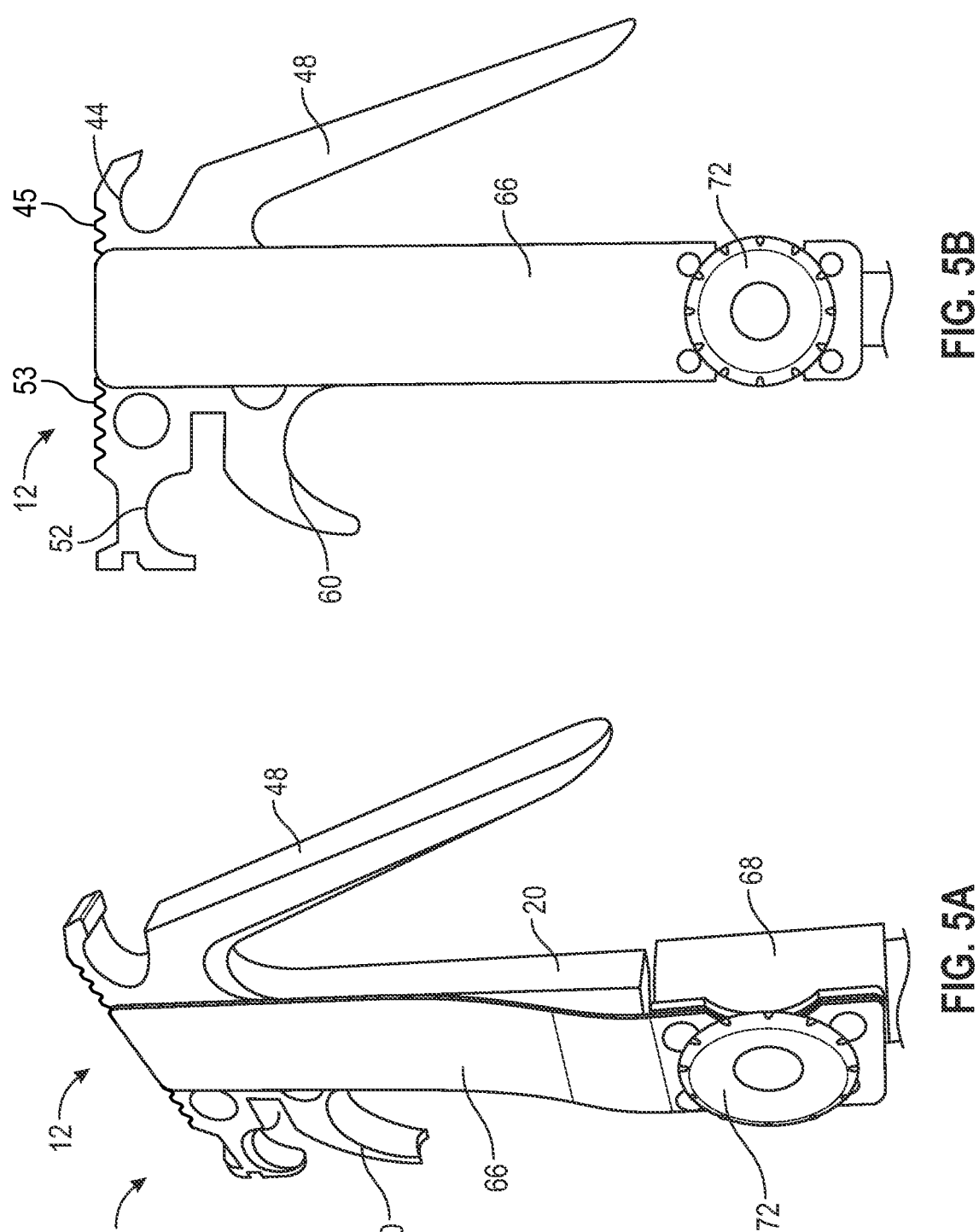
FIGS. 5A and 5B illustrate a front perspective view and a front view, respectively of the plate member connecting the grapple, in accordance with one embodiment of the present invention.

FIGS. 4A and 4B show the feature of plate member 66. Plate member 66 indicates a thin metal structure that comes in a rectangular configuration. In one embodiment, plate member 66 is made to bend slightly such that the free end of the plate member 66 rests against the surface of grapple 20 when connected. In one example, plate member 66 has a length of approximately 8 to 9 inches. Plate member 66 provides a material made of a metal, hard plastic or any other suitable material. Plate member 66 connects to a tubular member 68. Tubular member 68 encompasses hole 70 at the center. Plate member 66 includes actuator or ring-like structure 72 that comes in a circular configuration. Actuator 72 includes extending member 74. Extending member 74 extends perpendicularly from actuator 72 and inserts in hole 70 for connecting plate member 66 to grapple 20. In order to connect plate member 66 to grapple 20, at first, tubular member 68 connects to telescopic handle 22 at the top. Plate member 66 positions at rear end 30 (control surface) of grapple 20 and extending member 74 inserts through hole 70. Subsequently, actuator 72 tightens to lock the position of plate member 66 on grapple 20. FIGS. 5A and 5B show the feature of plate member 66 connecting grapple 20 at rear end 30. Plate member 66 positions with a gap from grapple 20, as shown in FIG. 5A. Plate member 66 helps to harness or place the components 18 e.g., straps underneath the control of grapple 20 at rear end 30 i.e., control surface of grapple 20. A person skilled in the art understands that it is possible to slide plate member 66 along the length of first arm 32 and second arm 34 and tighten for locking its position over first arm 32 and second arm 34.

Figure 6:
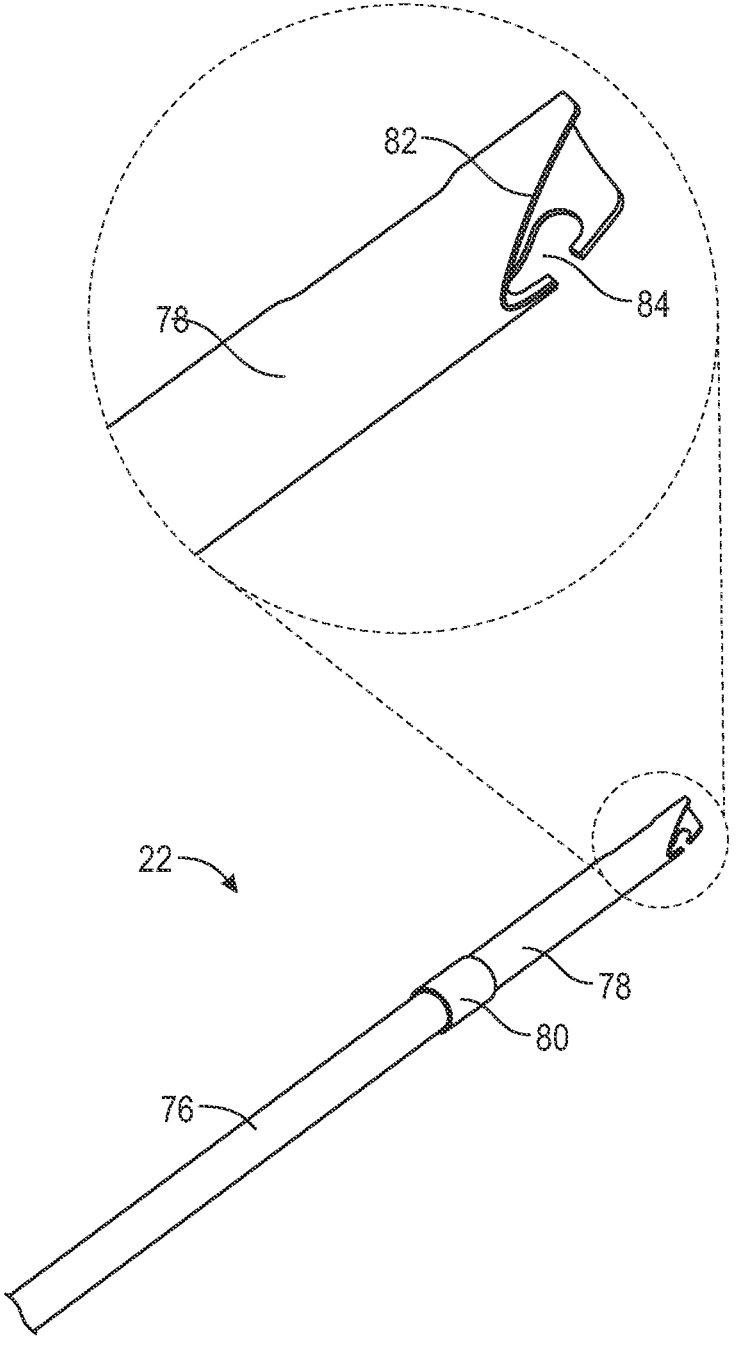
FIG. 6 illustrates a perspective view of a telescopic handle, in accordance with one embodiment of the present invention.

As specified above, grapple 20 connects to telescopic handle 22. FIG. 6 shows a perspective view of telescopic handle 22, in accordance with one embodiment of the present invention. Telescopic handle 22 includes first telescopic member 76 and second telescopic member 78. First telescopic member 76 has a larger diameter than second telescopic member 78. First telescopic member 76 configures to receive second telescopic member 78 and allows to reduce the length of telescopic handle 22. Further, second telescopic member 78 extends from first telescopic member

76 and allows to increase the length of telescopic handle 22. In one example, telescopic handle 22 includes handle actuator 80. Handle actuator 80 positions over first telescopic member 76 and helps to adjust the length of telescopic handle 22. User 14 twists handle actuator 80 to adjust the length of telescopic handle 22 by placing or extending second telescopic member 78 from first telescopic member 76 depending on the need. Second telescopic member 78 includes cut section 82 and curved groove 84 for connecting grapple 20 via connector 64.

In accordance with one embodiment of the present invention, device 12 aids user 14 in loading cargo platform 16. For example, device 12 aids user 14 in holding and placement of the cargo on cargo platform 16 using components 18. As specified above, components 18 include, but not limited to, cargo straps, ratchet cargo straps, winch straps, tarps, edge protectors or strap corner protectors, chains, transport chains, binders, bungee tarp, clips, plates, flanges, detents, hooks or grab hooks, and the like. In the present embodiment, user 14 holds telescopic handle 22 to connect one or more components 18 using grapple 20 and secures the cargo or load to cargo platform 16. Here, user 14 connects components 18 at one of grooves 38, 40, 42, first hook 44, extended arm 48, second hook 52, cut sections 54, 56, 58, third hook 60, holes 62 and combination thereof. Upon connecting, user 14 adjusts the length of telescopic handle 22 to place components 18 for securing the cargo or load to cargo platform 16.

Figures 7A, 7B:
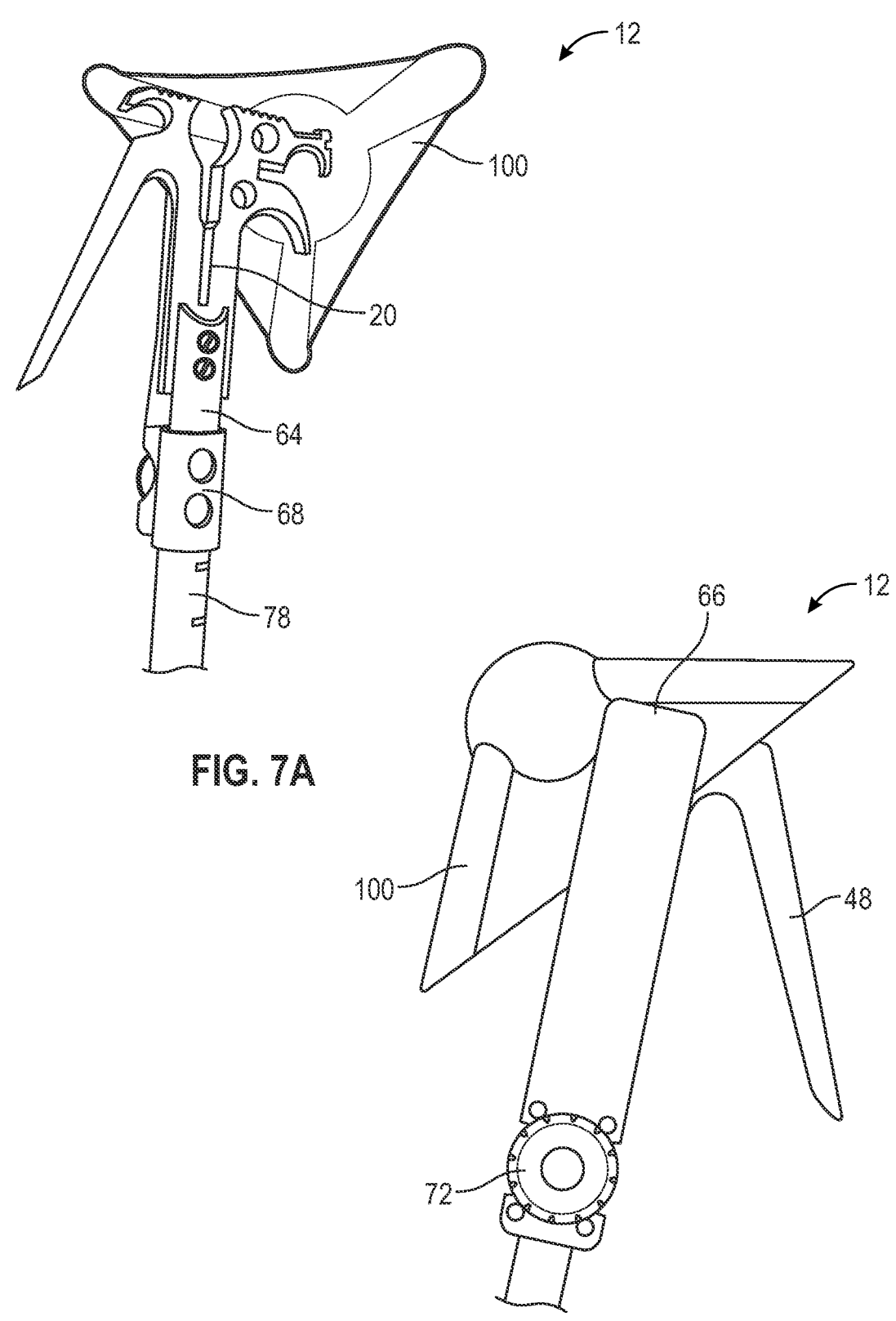
FIGS. 7A and 7B illustrate a bottom perspective view and a rear view, respectively of the grapple holding a triangular shaped edge protector, in accordance with one exemplary embodiment of the present invention.

FIGS. 7A to 19 show different ways of connecting components 18 using grapple 20 for securing the cargo or load to cargo platform 16. FIGS. 7A and 7B show a bottom perspective view and a rear view, respectively of grapple 20 holding triangular shaped edge protector 100, in accordance with one exemplary embodiment of the present invention. In the present embodiment, grapple 20 receives edge protector 100 at first end 23 through the gap provided between grapple 20 and plate member 66. Upon receiving, user 14 raises telescopic handle 22 to place edge protector 100 on the load and pulls back device 12.

Figures 8A, 8B:
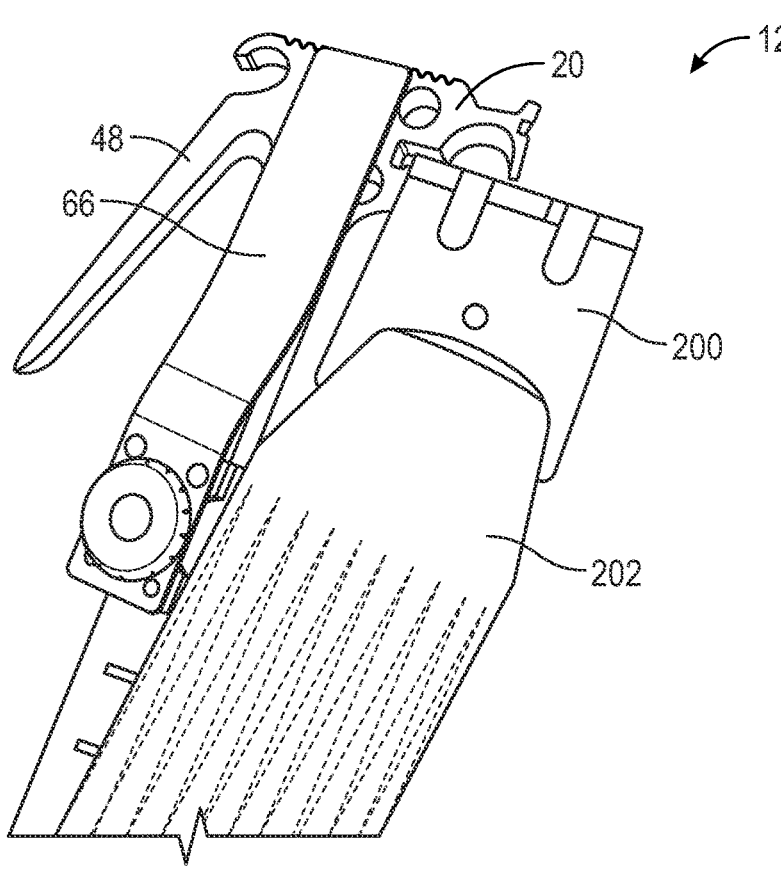
FIGS. 8A and 8B illustrate side perspective views of the grapple receiving a winch strap, in accordance with another exemplary embodiment of the present invention.

FIGS. 8A and 8B show side perspective views of grapple 20 receiving a winch strap, in accordance with one exemplary embodiment of the present invention. In one example, user 14 places flat hook 200 connecting winch strap 202 at third cut section 58. User 14 adjusts the length of telescopic handle 22 and positions flat hook 200 to secure the cargo or load on flatbed trailer. Subsequently, user 14 uses grapple 20 to hold or harness winch strap 202 and tightens the load.

Figures 9A, 9B:
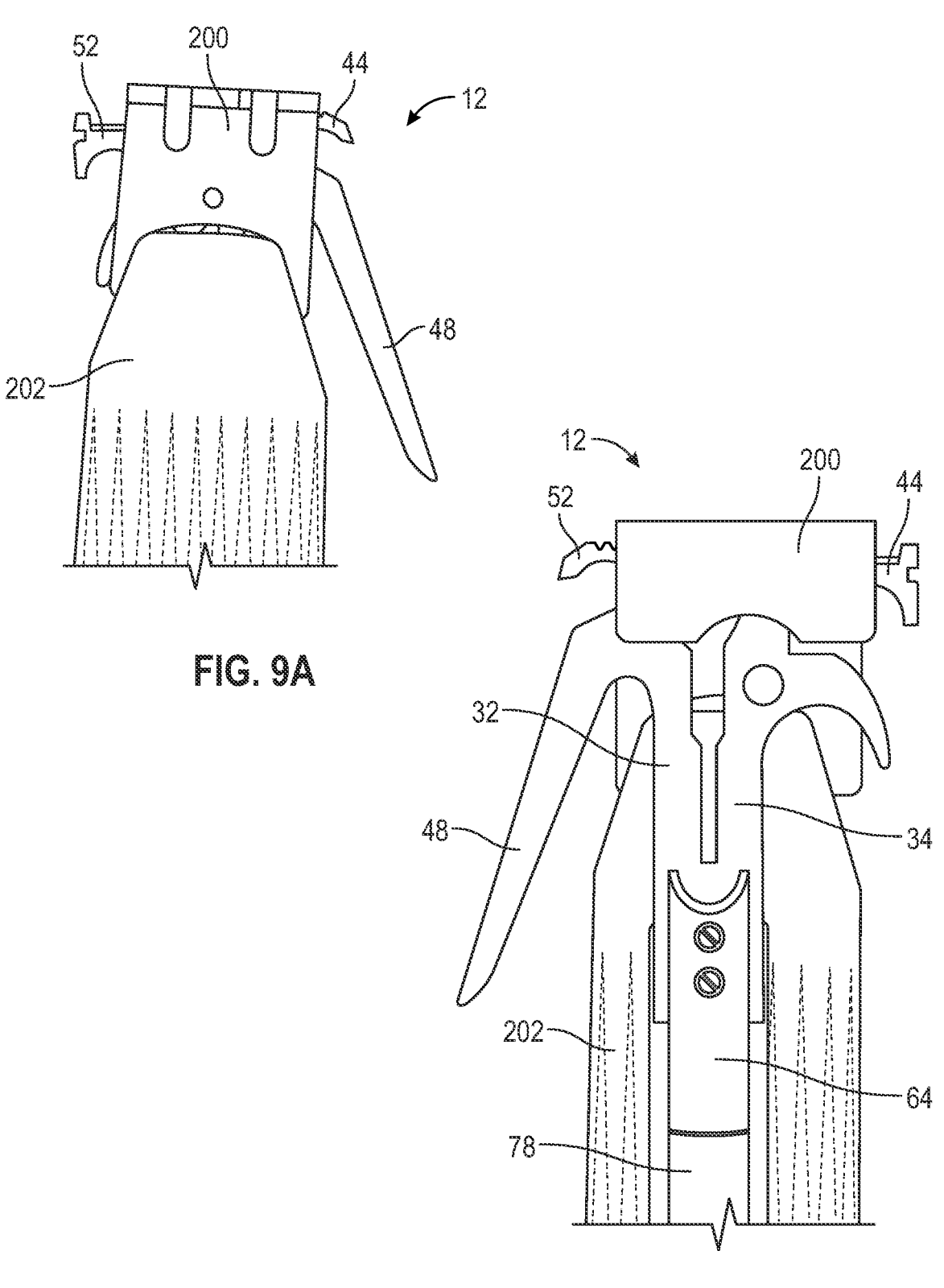
FIGS. 9A and 9B illustrate a rear view and a front view, respectively of device holding the winch strap, in accordance with another exemplary embodiment of the present invention.

FIGS. 9A and 9B show a rear view and a front view, respectively of device 12 holding the winch strap, in accordance with one exemplary embodiment of the present invention. Here, flat hook 200 places at first end 23 i.e., over first hook 44 and second hook 52 and winch strap 202 hangs down from the top of grapple 20. User 14 adjusts the length of telescopic handle 22 and places flat hook 200 at desired location to secure the cargo or load on flatbed trailer. For example, user 14 harnesses the winch strap as shown in FIG. 9A to push the winch strap to the other side of cargo platform 18 for strapping the load.

FIGS. 10A and 10B show a front perspective view and a rear view, respectively of device 12 holding a winch strap or nylon strap, in accordance with one exemplary embodiment of the present invention. Here, user 14 positions free end of winch strap 300 through the gap between grapple 20 and plate member 66 and engages actuator 72 to tightly hold winch strap 300. Subsequently, user 14 places winch strap 300 over top end 23 and hangs down winch strap 300, as shown in FIG. 10A. The present exemplary embodiment is used for placing winch strap 300 around the load.

Figure 11:
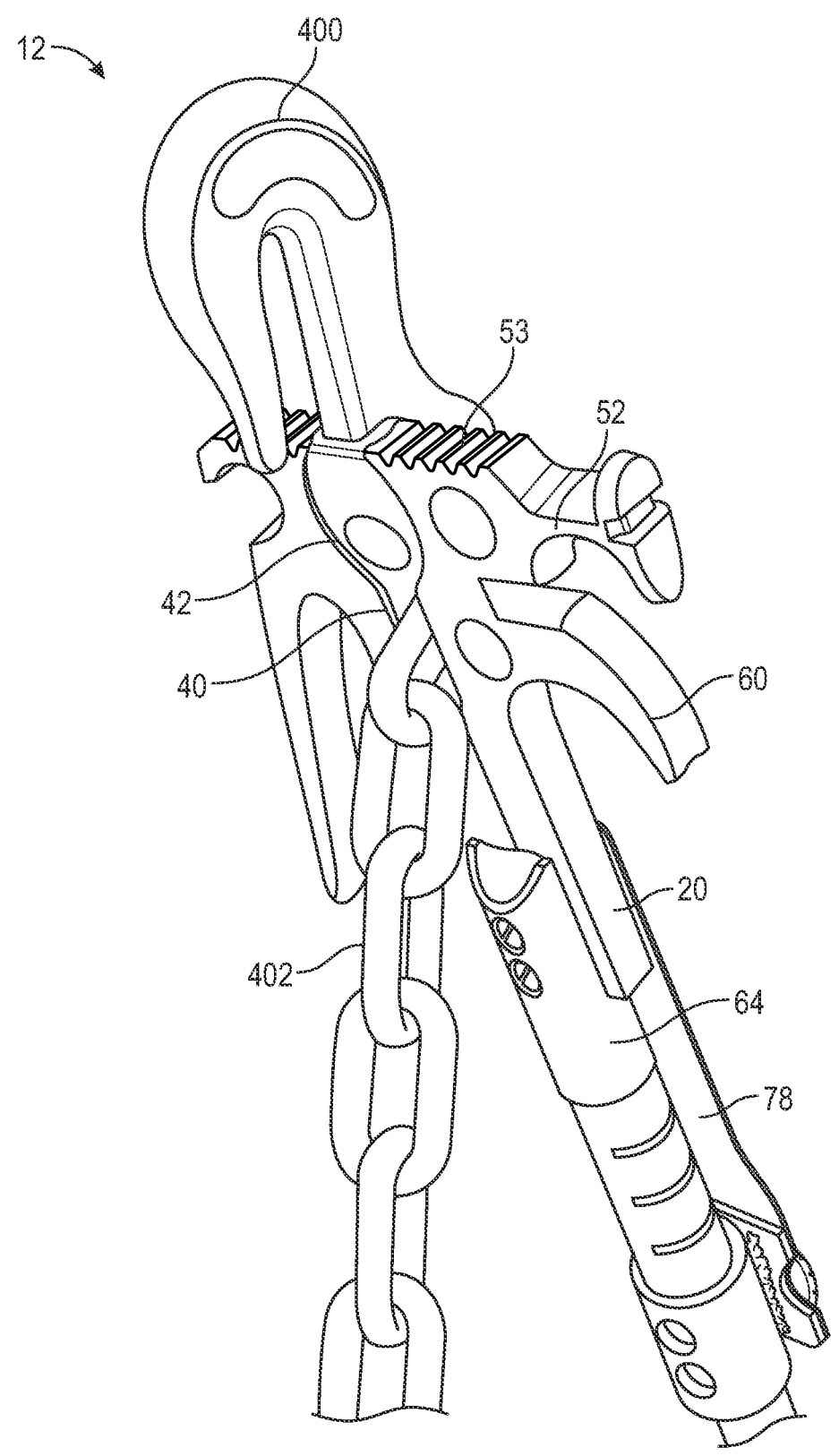
FIG. 11 illustrates a side perspective view of the device holding a grab hook with chain, in accordance with another exemplary embodiment of the present invention.

FIG. 11 shows a side perspective view of device 12 holding grab hook 400 with chain 402, in accordance with one exemplary embodiment of the present invention. In the present embodiment, user 14 lowers plate member 66 underneath grapple 20. Subsequently, user 14 places grab hook 400 at third groove 40 and chain 402 at second groove 38 of grapple 20. Further, user 14 raises device 12 to a desired position and connects grab hook 400 to a part in cargo platform 16.

Figure 12:
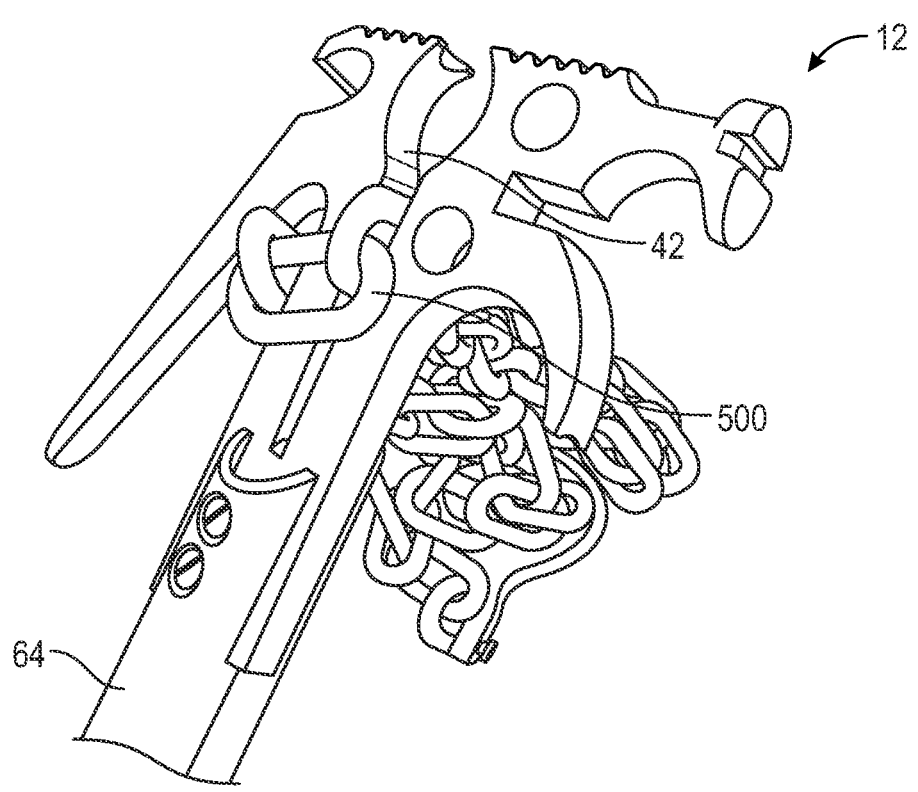
FIG. 12 illustrates a side perspective view of the device holding a chain, in accordance with another exemplary embodiment of the present invention.

FIG. 12 shows a side perspective view of device 12 holding chain 500, in accordance with one exemplary embodiment of the present invention. In the present embodiment, user 14 lowers plate member 66 underneath grapple 20. Subsequently, user 14 places chain 500 at second groove 40 through third groove 42. User 14 places chain 500 at second groove 40 for lifting chain 500 to a desired height for securing the load, for example.

Figure 13:
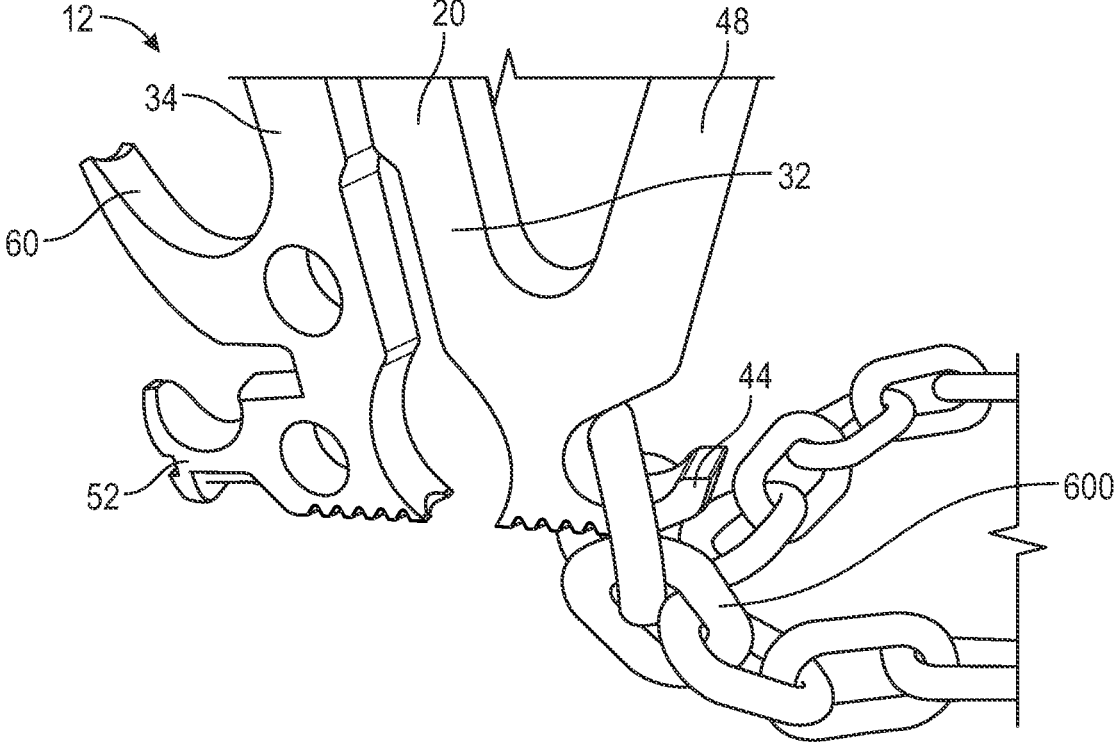
FIG. 13 illustrates a side perspective view of the device holding a chain, in accordance with another exemplary embodiment of the present invention.

FIG. 13 shows a side perspective view of device 12 holding chain 600, in accordance with one exemplary embodiment of the present invention. In the present embodiment, user 14 uses device 12 to pick up chain 600 from the ground, for example. Here, user 14 places first hook 44 to connect and pick up chain 600 for securing the load.

Figure 14A:
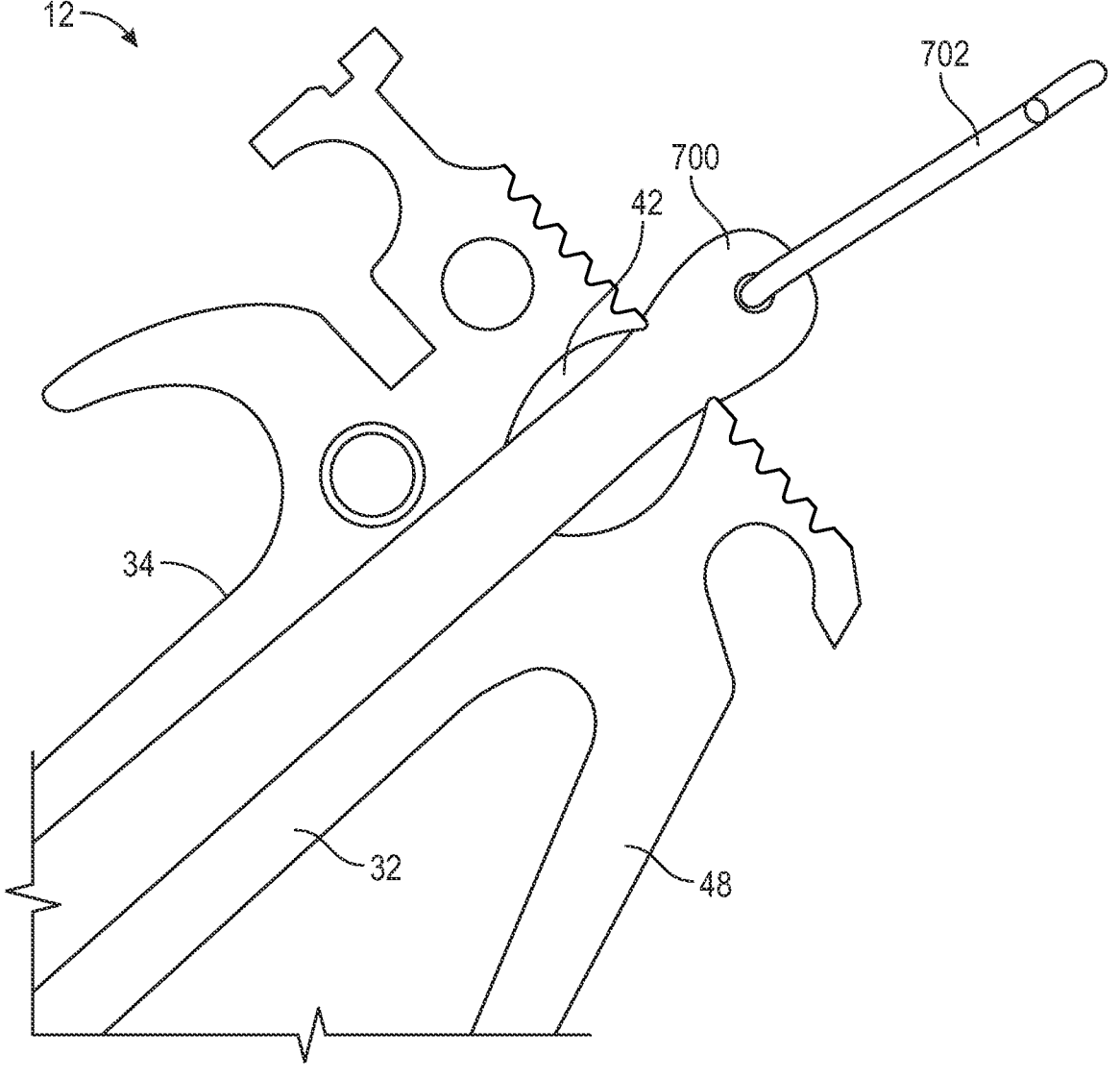
FIGS. 14A and 14B illustrate a rear perspective view and a side perspective view, respectively of the device holding a load binder with hook, in accordance with another exemplary embodiment of the present invention.
Figure 14B:
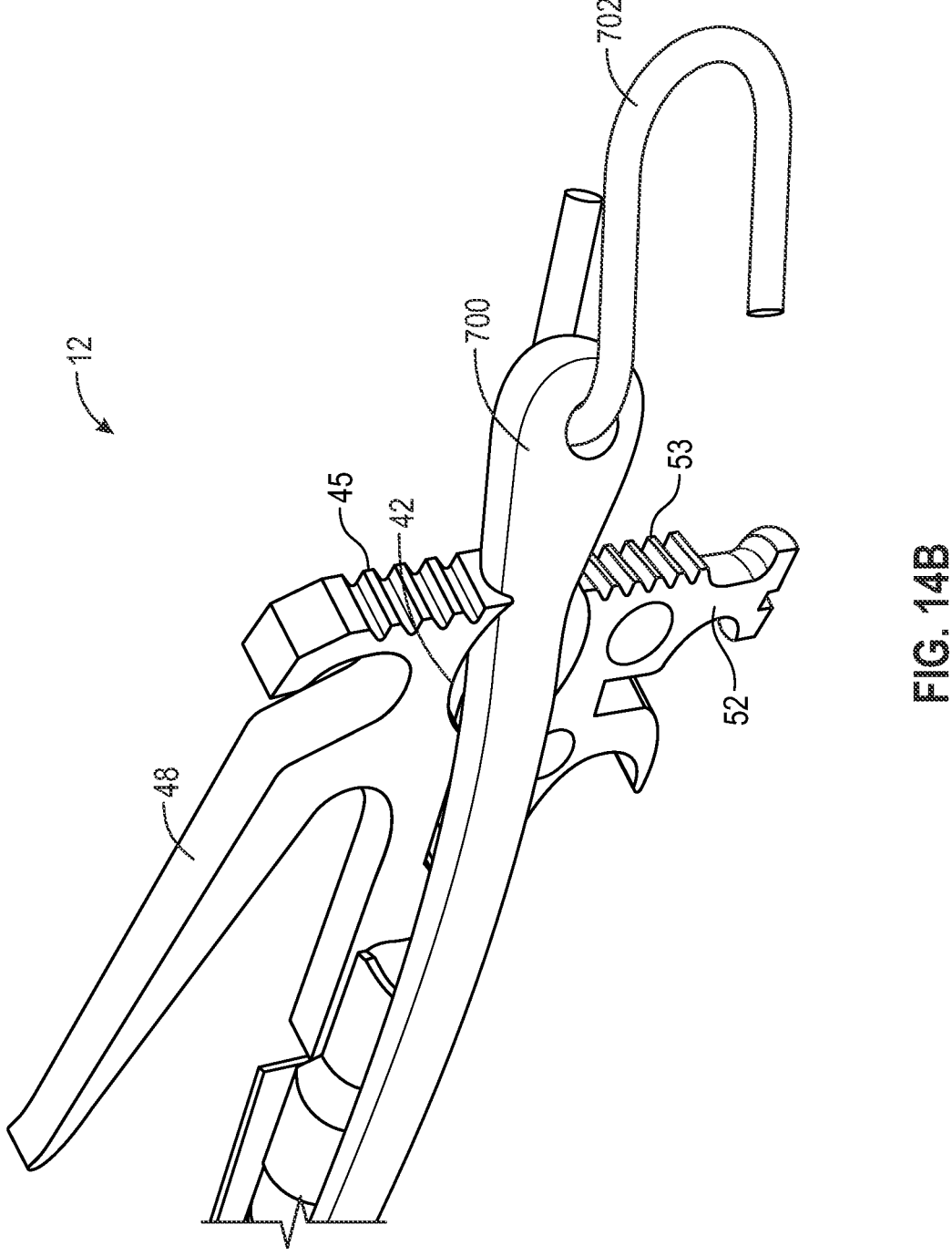

FIGS. 14A and 14B show a rear perspective view and a side perspective view, respectively of device 12 holding load binder 700 with hook 702, in accordance with one exemplary embodiment of the present invention. In the present embodiment, user 14 places load binder 700 through third groove 42. Subsequently, user 14 raises device 12 to connect hook 702 to a desired part for securing the load.

Figure 15A:
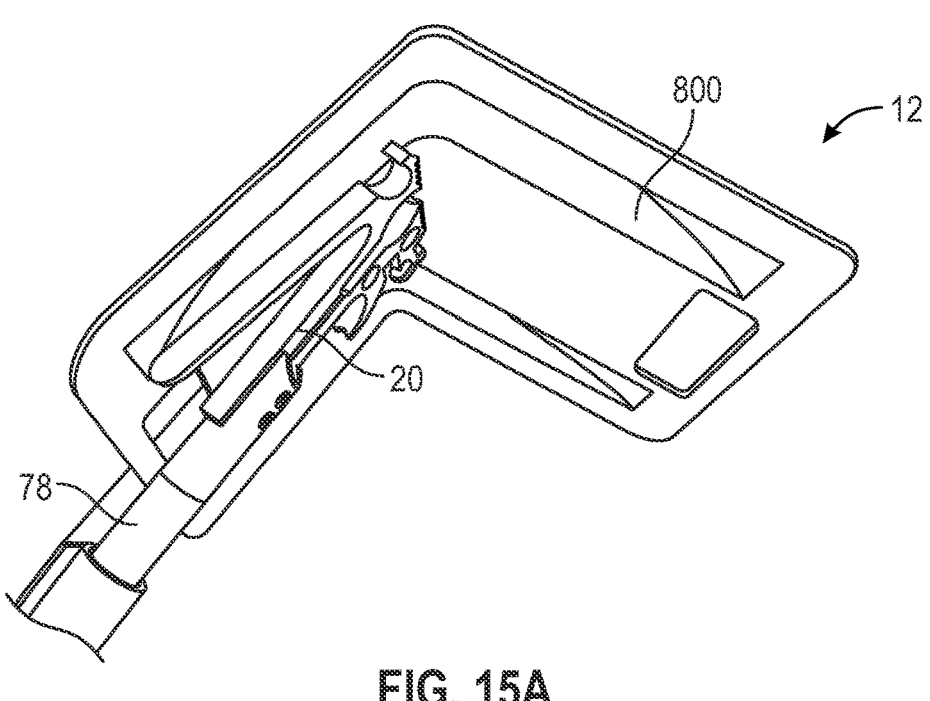
FIGS. 15A and 15B illustrate a side perspective view and a rear view, respectively of the device holding a corner protector, in accordance with another exemplary embodiment of the present invention.
Figure 15B:
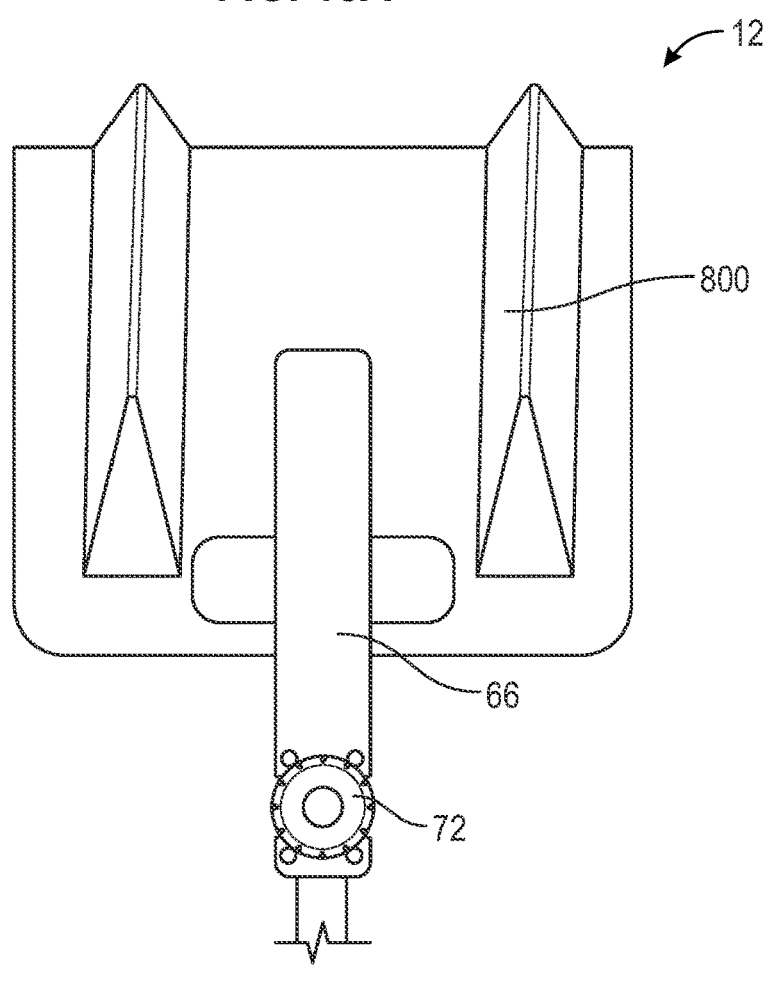

FIGS. 15A and 15B show a side perspective view and a rear view, respectively of device 12 holding corner protector 800, in accordance with one exemplary embodiment of the present invention. Here, grapple 20 receives corner protector 800 at first end 23 through the gap provided between grapple 20 and plate member 66. Upon receiving, user 14 raises telescopic handle 22 to place corner protector 800 on the load and pulls back device 12. In one example, user 14 places winch strap 300 (as shown in FIG. 10A) over corner protector 800 for securing the load, for example. As known, corner protector 800 helps to protect winch strap 300 from damaging the load.

Figure 16A:
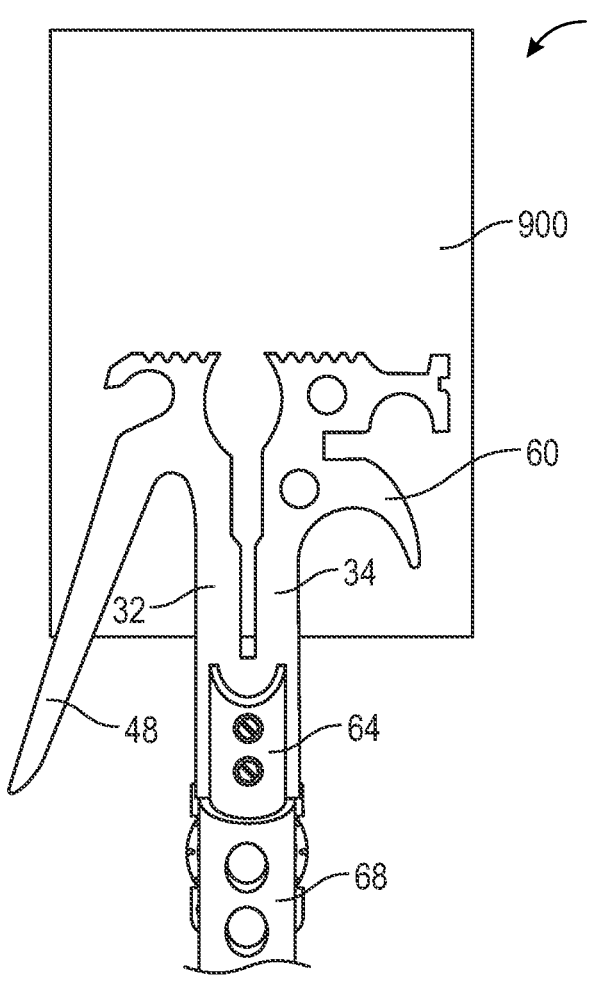
FIGS. 16A and 16B illustrate a front view and a rear perspective view, respectively of the device holding a sheet, in accordance with another exemplary embodiment of the present invention.
Figure 16B:
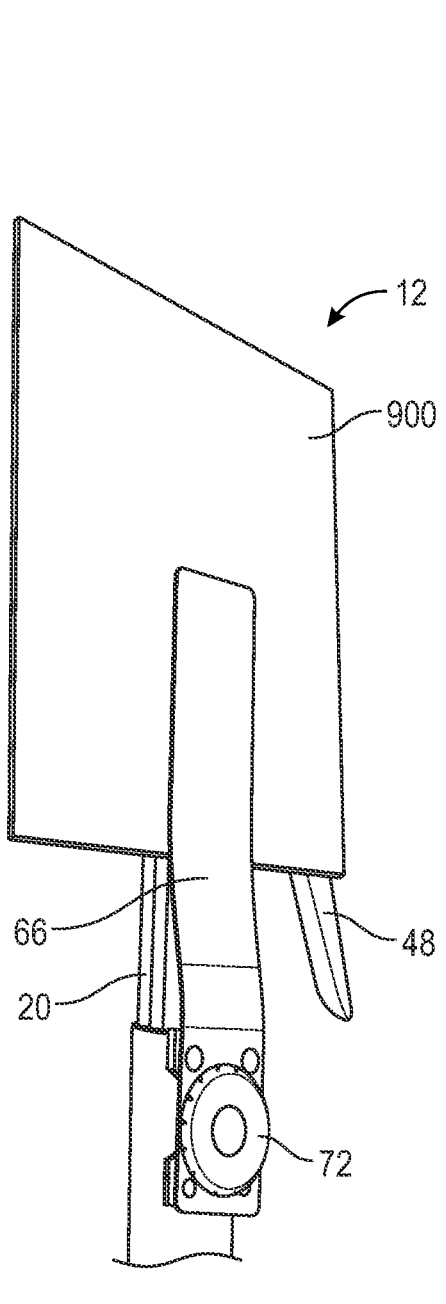

FIGS. 16A and 16B show a front view and a rear perspective view, respectively of device 12 holding or clipping a sheet, in accordance with one exemplary embodiment of the present invention. Sheet 900 includes both short and lock soft corner protectors. Here, user 14 positions sheet 900 through the gap between grapple 20 and plate member 66 and engages actuator 72 to tightly hold winch strap 300. Subsequently, user 14 places sheet 900 at desired location.

Figure 17:
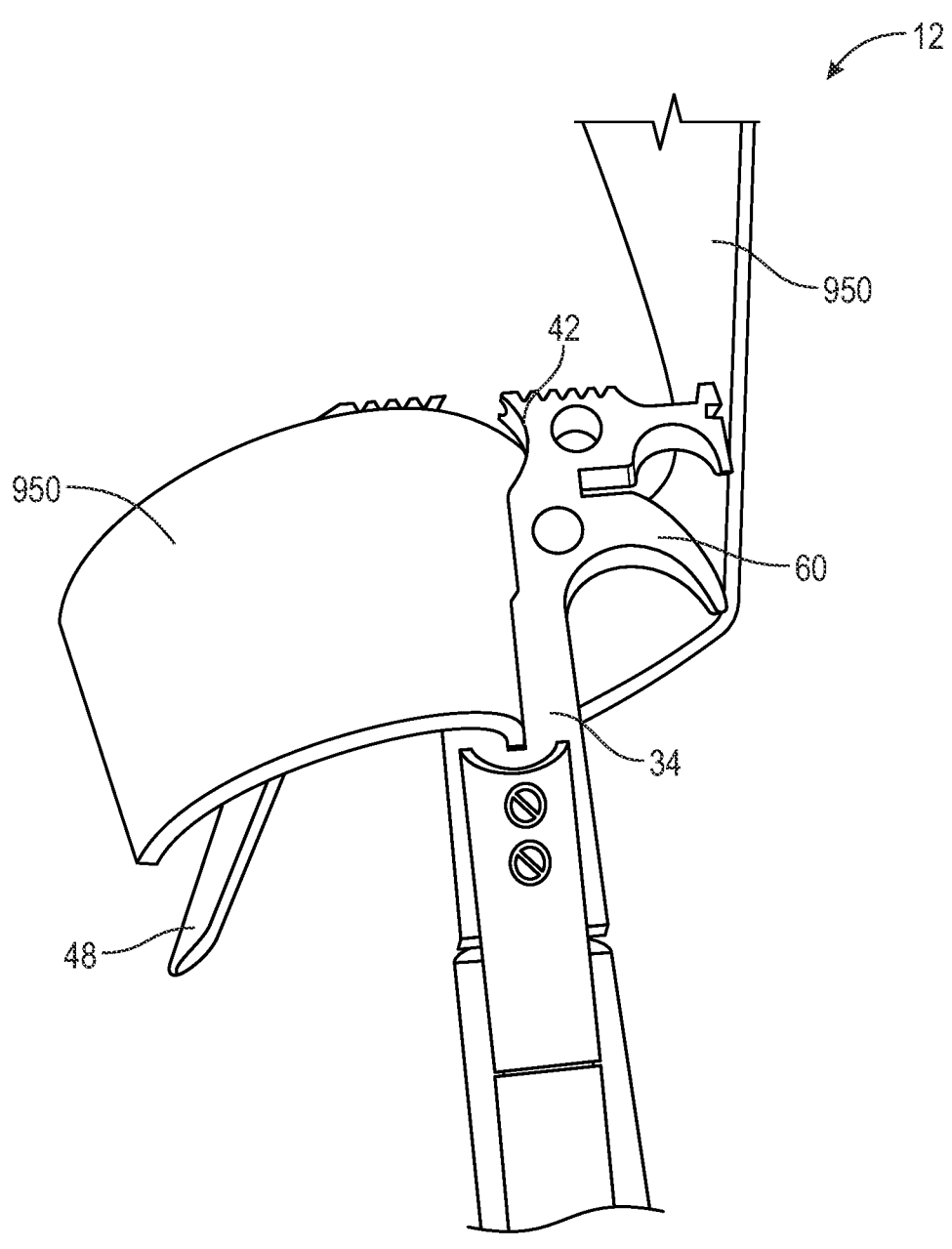
FIG. 17 illustrates a perspective view of the device holding a strap, in accordance with another exemplary embodiment of the present invention.

FIG. 17 shows a perspective view of device 12 hosing strap 950, in accordance with one embodiment of the present invention. Here, strap 950 draws through first groove 38, second groove 40 and third groove 42. Subsequently, user 14 twists device 12 for positioning second hook 52 and third hook 60 against strap 950 at its length. This allows user 14 to connect strap 950 to hold components 18 during loading and unloading of the load.

Figure 18:
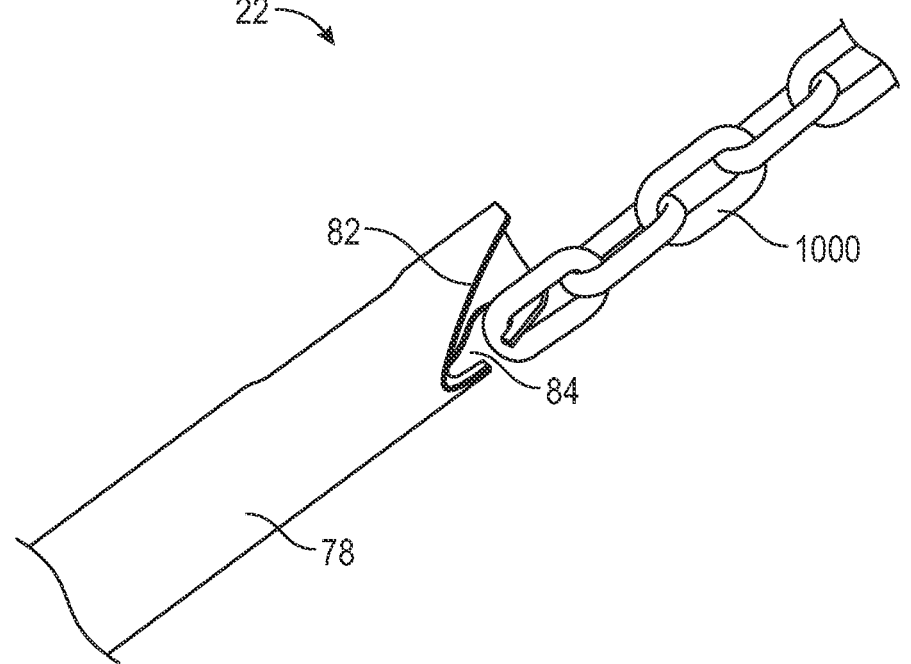
FIG. 18 illustrates a perspective view of the telescopic handle connecting a chain, in accordance with another exemplary embodiment of the present invention.

FIG. 18 shows a perspective view telescopic handle 22 connecting chain 1000 at one of cut section 82 and curved groove 84, in accordance with one embodiment of the present invention. The present embodiment presents usage of telescopic handle 22 as a standalone apparatus for harnessing or holding components 18 such as chain 1000 during loading and/or unloading of cargo platform 16.

Figure 19:
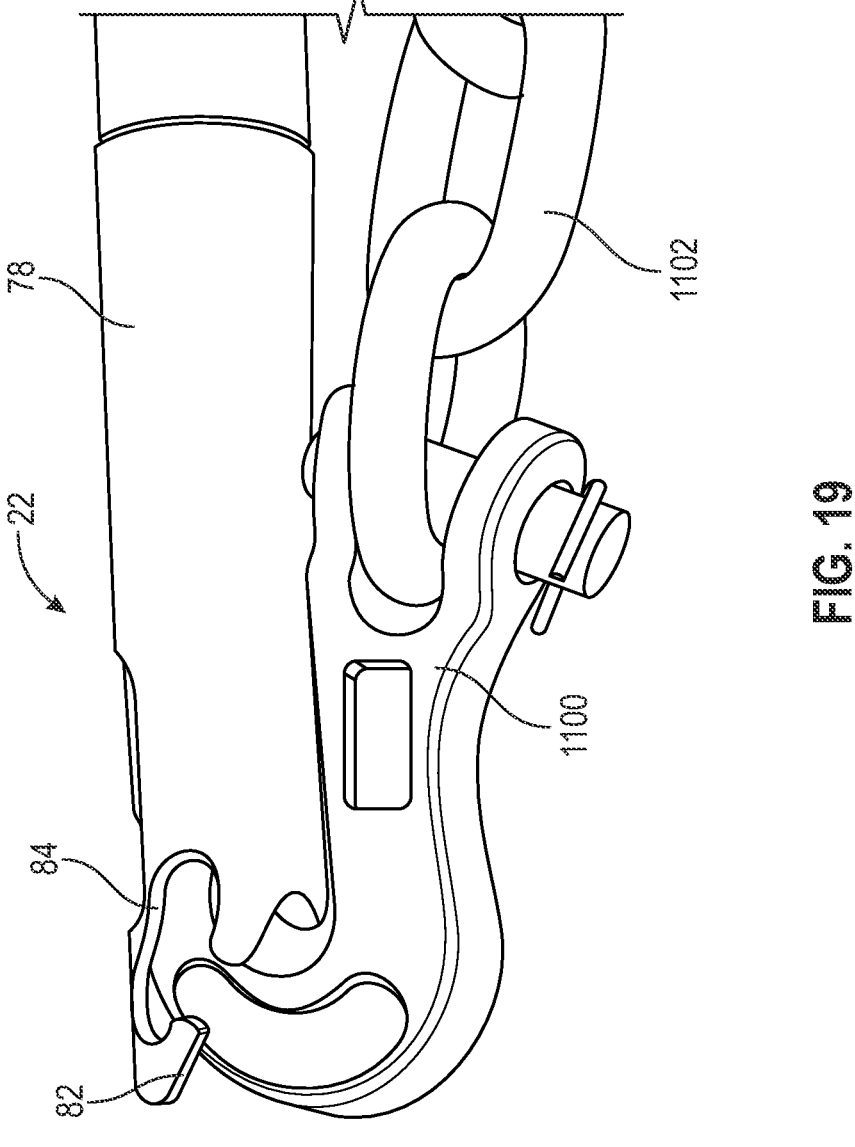
FIG. 19 illustrates a side perspective view of the telescopic handle connecting a chain with hook, in accordance with another exemplary embodiment of the present invention.

FIG. 19 shows a side perspective view telescopic handle 22 receiving hook 1100 connecting chain 1102 at one of cut section 82 and curved groove 84, in accordance with one embodiment of the present invention. The present embodiment presents usage of telescopic handle 22 as a standalone apparatus for harnessing or holding components 18 during loading and/or unloading of cargo platform 16.

In one exemplary embodiment, user 14 uses a measurement scale (not shown) in conjunction with device 12 to measure the length and width of components 18, wherever necessary. For example, user 14 uses the measurement scale to measure the length of strap needed to hold components 18 during loading and/or unloading of cargo platform 16.

Based on the above, a person skilled in the art understands that the user or truck driver can use the presently disclosed device for placing a variety of components to secure the load to the cargo platform such as a flatbed truck. The user can adjust the length of the telescopic handle and hold/harness and place the components at desired place to secure the load. The user can stand beside the cargo platform and operate the device for securing the load or stand on the cargo platform to pick up and secure the load using various components. The presently disclosed device provides multiple hooks and grooves. As such, a single device is sufficient to hold many components and avoids the need for multiple tools for securing the load to the cargo platform. When not in use, the user can place the second telescopic member into the first telescopic member and secure it to the cargo platform without requiring an additional storage box for storing it. Further, the user can adjust the length of the telescopic handle to secure the load thereby avoiding an injury during loading of the cargo onto the cargo platform.

A person skilled in the art appreciates that the device may come in a variety of sizes depending on the need and comfort of the user. Further, different materials in addition to or instead of materials described herein may also be used and such implementations may be construed to be within the scope of the present invention. Further, many changes in the design and placement of components may take place without deviating from the scope of the presently disclosed device.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A device for aiding in loading or unloading a cargo platform, comprising:
   a grapple having a first arm, a second arm, and a bridge section connecting the first arm and the second arm to form a U-shaped structure;
   a first hook extending from the first arm;
   an extended arm extending from the first arm and forming an area for receiving components;
   a second hook disposed on the second arm;
   a third hook disposed on the second arm beneath the second hook; and
   a telescopic handle coupled to the grapple;
   wherein the U-shaped structure presents a plurality of grooves arranged along a longitudinal axis between the first and second arms, the plurality of grooves having mutually different widths; and
   wherein each of the first hook, the extended arm, the second hook, and the third hook is configured to receive and hold a component.

2. The device of claim 1, wherein the plurality of grooves are located between the first and second arms and spaced along the longitudinal axis.

3. The device of claim 1, wherein at least one of the grooves has a substantially rectangular cross-section.

4. The device of claim 1, wherein at least one of the grooves has a substantially U-shaped cross-section.

5. The device of claim 1, wherein at least one of the grooves has a substantially circular cross-section.

6. The device of claim 1, wherein the telescopic handle includes a handle lock configured to fix a selected length of the telescopic handle during use.

7. The device of claim 1, wherein the second arm defines first and second through-holes respectively adjacent to the second hook and the third hook, each through-hole having an opening sized to receive a bungee-cord hook or a chain link and having rounded or chamfered edges configured to retain the hook or the link without cutting.

8. The device of claim 1, wherein the extended arm, the first hook, the second hook, and the third hook are each configured to receive and hold a cargo-securing component, including at least one of: a cargo strap, a ratchet strap, a winch strap, a tarp, an edge protector or strap corner protector, a chain, a transport chain, a binder, a hook or a grab hook, a cable, or a sheet.

\* \* \* \* \*